Nov. 15, 1938.                    C. PENN                    2,136,753
VARIABLE TEMPERATURE BURNER CONTROL SYSTEM
Filed Jan. 28, 1936

Witness
H. S. Mungenmaier

Inventor
Carl Penn
by Bair, Freeman & Sinclair
Attorneys

Patented Nov. 15, 1938

2,136,753

UNITED STATES PATENT OFFICE 2,136,753

VARIABLE TEMPERATURE BURNER CONTROL SYSTEM

Carl Penn, Des Moines, Iowa, assignor to Penn Electric Switch Co., Des Moines, Iowa, a corporation of Iowa Application January 28, 1936, Serial No. 61,166

3 Claims. (Cl. 236—46)

An object of my invention is to provide a variable temperature burner control system of simple, durable and inexpensive construction, especially adapted for a night circuit for a room thermostat.

Another object is to provide a control system operable to effect a change in the temperature at which the room thermostat operates and to prevent undesired over or under runs of room temperatures, as a result of using a night circuit, which causes the room thermostat to respond to a different temperature than its daytime response.

A further object is to provide a time controller for a room thermostat operable to reduce the temperature at which the thermostat operates during the night and increase the temperature during the daytime without, however, experiencing the usual overrun of temperature at the beginning of daytime operation.

More particularly it is my object to provide a room thermostat with a heater or other electro-responsive means effective to reduce the temperature at which the room thermostat operates during the night, or any other desired period of time, and to effect an increase in this temperature at a desired time by reducing the temperature of the electro-responsive means by reducing the supply of current thereto instead of merely breaking the circuit thereto, as has heretofore been done.

Another object is to vary the time at which the room thermostat heater is directly energized and deenergized, and to vary the time during which the current supply thereto is reduced, and also vary the degree of such reduction.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 4:
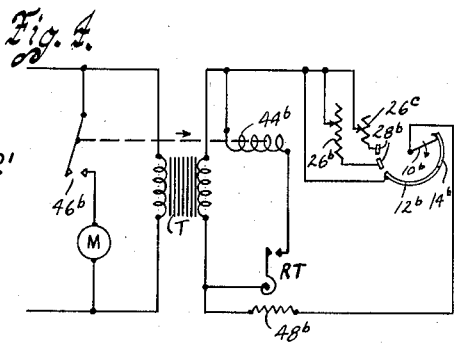
Figure 5:
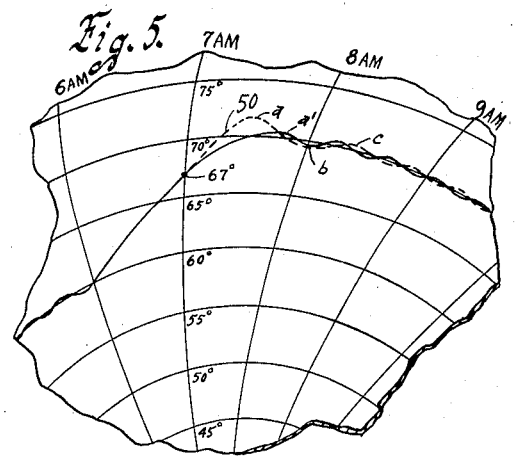

Figure 4 is a similar wiring diagram of a modified construction providing two variable steps for current reduction to the room thermostat heater; and Figure 5 illustrates a graph card showing temperature curves for hours of the day when the night circuit becomes ineffective, one curve showing the temperature caused by use of an ordinary night circuit thermostat, and the other curve caused by use of my present control system.

On the accompanying drawing I have used the reference character A to indicate generally a time switch such as a clock control switch of the general type used in connection with room thermostats, which includes heaters to be energized by the time switch and thereby reduce the effective temperature at which the room thermostat operates during the night. My time switch, however, has several improved features necessary to the operation of my control system in addition to the usual switch segment for directly energizing the room thermostat heater over a predetermined period of time.

The time switch A includes a switch arm 10 which rotates once each twenty-four hours. A pair of direct energization segments 12 and 14 are provided for coaction with the wiper contact 16 on the outer end of the arm 10. The segment 12 is adjustable by means of a handle 18, while the segment 14 is adjustable by means of a handle 20, so that the leading edge 14' of the segment 14 and the trailing edge 12' of the segment 12 (the switch arm 10 moving in the direction of the arrow 22) determine the period of direct energization for the night circuit, which will hereinafter be described. The leading and trailing edges of the segments 12 and 14 respectively are indicated at 12" and 14".

The handle 18 includes a segment 24 carrying a resistance 26 provided with contact buttons 28 for the wiper 16 to engage. An insulating segment 30 provided with a handle 32 is adjustable to determine the number of contact buttons 28 to be engaged by the wiper 16 during one revolution thereof.

The leading edge of the segment 30 is provided with a contact 31. In the base of the time switch A I provide a resistance 34 connected with the contact buttons 36. A wiper contact 38 is mounted on a carrier 40 slidable along a guide bar 42.

Figure 2:
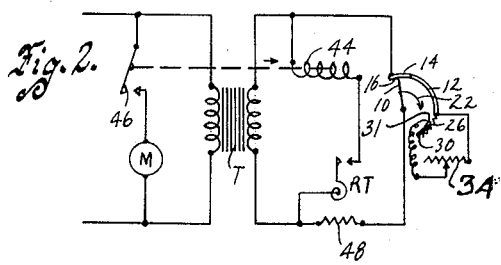
Figure 2 is a wiring diagram for a burner and room thermostat with the timer switch included in the circuit.

The electric hook-up for the segments 12 and 14 and the resistances 26 and 34 is shown in Figure 2. A transformer T is provided for supplying low voltage current to a relay 44 controlled by a room thermostat RT. A burner motor is illustrated at M, and a switch therefor at 46 normally open, but closed by the relay 44 upon energization thereof.

The room thermostat is provided with an electro-responsive means such as a resistance wire 48. The heat from the resistance wire 48, when it is energized, effects an increase in the ambient temperature, affecting the room thermostat so that if the heater 48 radiates 10° of heat, the thermostat will operate at 60° instead of 70°. Thus by having the heater 48 energized during the night, the thermostat will maintain the room at 60° instead of 70°.

Figure 1:
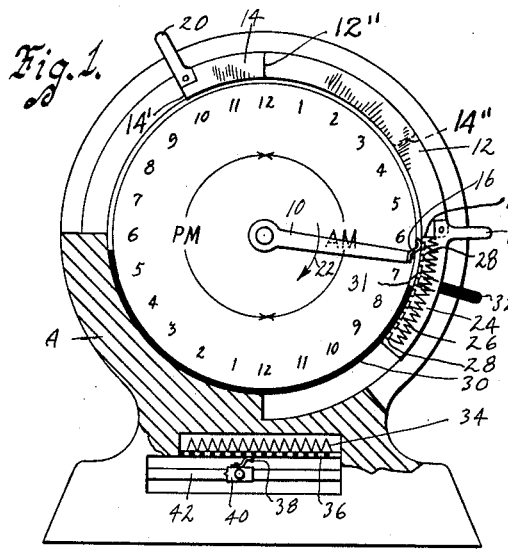
Figure 1 is a semi-diagrammatical view of a time switch used in connection with my variable temperature burner control system.

The segments 14 and 12, the resistance 26 and the switch arm 10 are connected in series with the heater 48 when the switch arm 10 is in position contacting with one of the contacts 28. From 10:00 p. m. to 6:00 a. m., however, (using the example shown in Figure 1, the hours being marked on the face of the time switch) the switch arm 10 provides a direct circuit established through the heater 48, as in Figure 2. Thus the heater will be heated to its maximum degree. At 6:00 a. m. the energization of the heater 48 will be gradually reduced until 7:00 a. m. by the setting illustrated in Figure 1, instead of the circuit being broken to the heater at 6:00 a. m., as ordinarily done.

Referring to the chart in Figure 5, the dotted line 50 indicates the room temperature experienced by the use of an ordinary room thermostat cutting off at 70°. It will be noted that the temperature curve overruns at *a*, underruns at *b*, and again overruns slightly at *c* before it levels out to maintain a substantially constant temperature adjacent 70°. By gradually reducing the temperature of the heater 48, however, between six and seven o'clock, there will still be some heat radiated therefrom at seven o'clock, for instance about 3°. This will cause the thermostat to cut off at 67°, indicated as a dot in Figure 5. Thereafter the temperature curve will round off and extend up only to the point *a'* instead of to the point *a*, as with the ordinary thermostat.

This overrun *a* is especially experienced with the usual thermostat due to the wall being cool by reason of the room temperature at night being 60° instead of 70°, and the wall of course not warming up as quickly as the atmosphere in the room, and thereby affecting the thermostat to some degree.

By providing the resistance 26, however, so that there is still a small amount of current flow through the heater 48 when the room temperature reaches adjacent 70°, cut-off will occur earlier, thus preventing an overrun, as shown by the solid line in Figure 5. Sometimes the graph line between six and seven o'clock will be steeper, and it will therefore be desirable to cut off the resistance at an earlier hour than seven o'clock. This can be accomplished by moving the handle 32 counterclockwise, while to increase the period of time during which the resistance 26 is in effect, the handle 32 can be moved clockwise.

In case it is desirable to decrease the resistance value of the part of the resistance 26 finally in the circuit so as to permit greater current flow therein to secure a greater degree of energization of the heater 48, this can be accomplished by cutting in more of the resistance 34, this resistance being shunted across whatever part of the resistance 26 is effective, as determined by the leading edge of the insulation 30 and the contact 31. Obviously the less resistance at 34 in the circuit, the lighter the current flow through the portion of the resistance 26 which shunts the portion of the resistance 34 in the circuit.

Thus I have provided for varying the "on" and "off" direct circuit for the heater 48 by the control handles 20 and 18, respectively, the handle 18 controlling the beginning of the period when the resistance 26 is in circuit with the heater 48, and the handle 32 controlling the cut-off period for the heater 48, as well as the adjustment of the carrier 40 varying the degree of energization of the heater 48 in conjunction with such variation automatically by steps due to the wiper 16 passing over the contacts 28.

Figure 3:
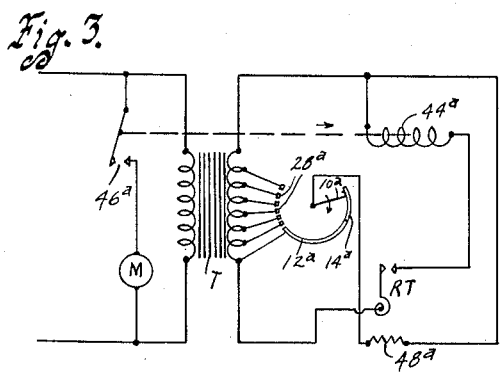
Figure 3 is a similar wiring diagram showing a tapped transformer for varying the current supply to the room thermostat heater.

In Figure 3 I show a modified construction in which the secondary of the transformer T is tapped, the taps thereof extending to a series of contacts 28a, so that after the timer switch arm 10a traverses the segments 14a and 12a, it will successively reduce the current supply to the heater 48a by steps without the necessity of providing an additional resistance.

In Figure 4 I show a pair of resistances 26b and 26c, each of which is adjustable and provide for two steps of current reduction only, although each step is individually variable to meet the requirements of a given installation. Usually the second step afforded by the resistance 26c would supply a very minute current to the heater 48b, whereas the resistance 26b could supply possibly half the current supplied directly by the segments 14b and 12b.

I have disclosed several methods whereby energization of a heater for a night circuit of a room thermostat can be reduced, instead of cut off entirely when it is desired to terminate the temperature. Any one of these methods is effective to reduce the overrun experienced with ordinary types of room thermostats employing night circuits.

The various methods disclosed indicate changes that may be made, and also others may be made in the construction and arrangement of my control system without departing from the real spirit and purpose of my invention, and it is my intention to cover by my claims, any modified forms of structure or use of mechanical equivalents, which may be reasonably included within their scope.

I claim as my invention:

1. In a variable temperature burner control system, a room thermostat, an electrically operated heater for effecting a reduction in the temperature at which said room thermostat operates in proportion to the degree of current supplied to said electrically operated heater and a controller for the current supplied thereto comprising a time operated rheostat operable to energize said heater for a predetermined period of time, then gradually reduce energization thereof by steps for a further predetermined period of time and finally deenergize said heater.

2. In a variable temperature burner control system, a room thermostat, electro-responsive means for effecting a change in the temperature at which said room thermostat operates in proportion to the degree of current supplied to said electro-responsive means, a controller for the current supplied thereto, means for energizing said electro-responsive means for a predetermined period of time, then reducing the energization thereof for a further predetermined period of time and finally deenergizing said electro-responsive means, means for varying each predetermined period of time and means for varying the degree of such reduced energization.

3. In a variable temperature burner control system, a room thermostat, electro-responsive means for effecting a change in the temperature at which said room thermostat operates in proportion to the degree of current supplied to said electro-responsive means and a clock operated controller for the current supplied thereto comprising a time-operated rheostat operable to maintain a predetermined current flow for a predetermined time and thereafter reducing such current flow through the electro-responsive means for a further predetermined time period and then deenergizing said electro-responsive means.

CARL PENN.